(12) United States Patent
Chen et al.

(10) Patent No.: US 12,235,197 B2
(45) Date of Patent: Feb. 25, 2025

(54) AUTOMATIC PROCESSING DEVICE FOR LIQUID SAMPLES

(71) Applicants: Cancer Free Biotech Ltd., Taipei (TW); SONGYI SYSTEM CO., LTD., Hsinchu County (TW)

(72) Inventors: Po-Han Chen, Taipei (TW); Shih-Pei Wu, Yilan County (TW); Yi-Hsuan Chen, Miaoli County (TW); Chung-I Chen, Taoyuan (TW); Chun-Chieh Chiang, Hsinchu County (TW); Chi-Ming Lee, Hsinchu County (TW)

(73) Assignees: CANCER FREE BIOTECH LTD., Taipei (TW); SONGYI SYSTEM CO., LTD., Hsinchu County (TW)

( * ) Notice: Subject to any disclaimer, the term of this patent is extended or adjusted under 35 U.S.C. 154(b) by 796 days.

(21) Appl. No.: 17/236,255

(22) Filed: Apr. 21, 2021

(65) Prior Publication Data
US 2021/0333180 A1 Oct. 28, 2021

Related U.S. Application Data

(60) Provisional application No. 63/013,567, filed on Apr. 22, 2020.

(51) Int. Cl.
| | | |
|---|---|---|
| *G01N 1/40* | (2006.01) |
| *B04B 5/04* | (2006.01) |
| *B04B 7/12* | (2006.01) |
| *B04B 9/14* | (2006.01) |
| *B04B 11/04* | (2006.01) |
| *G01N 35/00* | (2006.01) |
| *G01N 35/10* | (2006.01) |

(52) U.S. Cl.
CPC ......... *G01N 1/4077* (2013.01); *B04B 5/0421* (2013.01); *B04B 7/12* (2013.01); *B04B 9/146* (2013.01); *B04B 11/04* (2013.01); *G01N 35/10* (2013.01); *B04B 2011/046* (2013.01); *G01N 2035/00504* (2013.01)

(58) Field of Classification Search
CPC .............. G01N 1/4077; G01N 35/10; G01N 2035/00504; G01N 35/00732; G01N 2035/0405; G01N 35/1067; G01N 35/025; G01N 2035/1039; G01N 1/34; G01N 35/00; G01N 2035/00495; B04B 5/0421; B04B 7/12; B04B 9/146; B04B 11/04; B04B 2011/046
See application file for complete search history.

(56) References Cited

U.S. PATENT DOCUMENTS

| | | | | |
|---|---|---|---|---|
| 7,787,681 | B2 * | 8/2010 | Zhang | C40B 60/12 |
| | | | | 382/128 |
| 8,029,742 | B2 * | 10/2011 | Butz | B01L 3/0217 |
| | | | | 422/501 |
| 8,518,345 | B2 * | 8/2013 | Butz | B01L 3/0217 |
| | | | | 422/501 |
| 9,910,054 | B2 * | 3/2018 | Johns | G01N 21/27 |
| 2005/0158212 | A1 | 7/2005 | Yavilevich | |
| 2016/0299162 | A1 * | 10/2016 | Kappelhoff | G01N 35/1016 |
| 2020/0319222 | A1 * | 10/2020 | VanSickler | B25J 15/0066 |

FOREIGN PATENT DOCUMENTS

| | | | | |
|---|---|---|---|---|
| CN | 101060221 A | | 10/2007 | |
| CN | 206038392 U | | 3/2017 | |
| CN | 106918482 A | | 7/2017 | |
| CN | 108865879 A | | 11/2018 | |
| CN | 110297100 A | * | 10/2019 | |
| CN | 216695789 U | | 6/2022 | |
| KR | 20170127993 A | * | 11/2017 | ............. G01N 21/17 |
| TW | 201723483 A | * | 7/2017 | ............... G01N 1/28 |
| WO | WO-2017221155 A1 | * | 12/2017 | ................ B01L 1/02 |

\* cited by examiner

*Primary Examiner* — Aaron J Kosar
*Assistant Examiner* — Andrew T Moehlman
(74) *Attorney, Agent, or Firm* — Winston Hsu (57) ABSTRACT

An automatic processing device for liquid samples includes a sample region, a control module, an image identification device and a centrifuge. The sample region is configured to accommodate a plurality of centrifuge tubes. The control module includes a mechanical module. The mechanical module is configured to unscrew or tighten upper caps of the centrifuge tubes, and is configured to draw liquid from the centrifuge tubes or discharge liquid to the centrifuge tubes. The image identification device is coupled to the control module. The centrifuge is coupled to the control module. The centrifuge is configured to accommodate the centrifuge tubes and perform centrifugal treatment.

19 Claims, 10 Drawing Sheets

AUTOMATIC PROCESSING DEVICE FOR LIQUID SAMPLES

CROSS-REFERENCE TO RELATED APPLICATION

This application claims priority to U.S. Provisional Application Ser. No. 63/013,567, filed Apr. 22, 2020, which is herein incorporated by reference.

FIELD OF THE INVENTION

The present disclosure relates to an automatic processing device for liquid samples, in particular, to an automatic processing device for blood samples of a biological body.

BACKGROUND OF THE INVENTION

Separation of a specific component from a liquid sample, for example, the separation of peripheral blood mononuclear cells (PBMC) from a blood sample of a biological body, is mostly performed manually in a series of steps including sampling, mixing, centrifuging, and taking a supernatant. However, manual methods are not conducive to processing a large number of blood samples, and issues such as human mistaking or human judgment errors may occur.

SUMMARY OF THE INVENTION

Therefore, the present disclosure provides an automatic processing device for liquid samples, thereby reducing labor costs, shortening the overall processing time, and avoiding human mistaking and human judgment errors.

The automatic processing device for the liquid samples of the present disclosure includes a sample region, a control module, an image identification device and a centrifuge. The sample region is configured to accommodate a plurality of centrifuge tubes. The control module includes a mechanical module. The mechanical module is configured to unscrew or tighten upper caps of the centrifuge tubes, and is configured to draw liquid from the centrifuge tubes or discharge liquid to the centrifuge tubes. The image identification device is coupled to the control module. The centrifuge is coupled to the control module. The centrifuge is configured to accommodate the centrifuge tubes and perform centrifugal treatment.

In some embodiments of the present disclosure, the sample region is further configured to accommodate a plurality of blood collection tubes, and the image identification device is configured to identify a sample label of each of the blood collection tubes and/or identify a height of a blood volume in each of the blood collection tubes, and the mechanical module is further configured to discharge liquid to at least one of the blood collection tubes that the height of the blood volume does not reach a set value, so that the height of the blood volume in the blood collection tube reaches the set value.

In some embodiments of the present disclosure, the image identification device is configured to identify a certain layer of a sample in each of the centrifuge tubes, and the mechanical module is further configured to draw the layer from each of the centrifuge tubes.

In some embodiments of the present disclosure, the image identification device is configured to capture and identify images of the centrifuge tubes before the centrifugal treatment and/or after the centrifugal treatment.

In some embodiments of the present disclosure, the sample region includes an uncapping/capping region and a liquid drawing/discharging region adjacent to the uncapping/capping region, and the device further includes a carrier configured to carry the centrifuge tubes and move between the uncapping/capping region and the liquid drawing/discharging region.

In some embodiments of the present disclosure, the centrifuge tubes at least include a first group of the centrifuge tubes and a second group of the centrifuge tubes, and a size of each of the first group of the centrifuge tubes is larger than that of each of the second group of the centrifuge tubes, and the mechanical module includes: an uncapping/capping machine configured to simultaneously unscrew or tighten upper caps of the first group of the centrifuge tubes and configured to simultaneously unscrew or tighten upper caps of the second group of the centrifuge tubes.

In some embodiments of the present disclosure, the uncapping/capping machine includes: a plurality of clamping portion, each of the clamping portions having a first clamping portion and a second clamping portion, and the second clamping portion located over the first clamping portion, and the first clamping portion corresponding to an upper cap of one of the first group of the centrifuge tubes, and the second clamping portion corresponding to an upper cap of one of the second group of the centrifuge tubes.

In some embodiments of the present disclosure, the sample region is further configured to accommodate a group of liquid sample tubes, and the uncapping/capping machine is further configured to pull up upper caps of the group of the liquid sample tubes.

In some embodiments of the present disclosure, the uncapping/capping machine includes: a plurality of clamping portions, each of the clamping portions having a first clamping portion, a second clamping portion and a third clamping portion, and the second clamping portion located over the first clamping portion, and the third clamping portion located over the second clamping portion, and the first clamping portion corresponding to an upper cap of one of the first group of the centrifuge tubes, and the second clamping portion corresponding to an upper cap of one of the second group of the centrifuge tubes, and the third clamping portion corresponding to an upper cap of one of the liquid sample tubes.

In some embodiments of the present disclosure, a width of a third space defined by the third clamping portion is smaller than a width of a second space defined by the second clamping portion, and the width of the second space defined by the second clamping portion is smaller than a width of a first space defined by the first clamping portion.

In some embodiments of the present disclosure, the centrifuge tubes at least include a first group of the centrifuge tubes and a second group of the centrifuge tubes, and a size of each of the first group of the centrifuge tubes is larger than that of each of the second group of the centrifuge tubes, and the mechanical module includes: a liquid drawing/discharging machine configured to simultaneously draw the liquid from the first group of the centrifuge tubes, and configured to simultaneously draw the liquid from the second group of the centrifuge tubes, and configured to simultaneously discharge the liquid to the first group of the centrifuge tubes, and configured to simultaneously discharge the liquid to the second group of the centrifuge tubes.

In some embodiments of the present disclosure, the liquid drawing/discharging machine includes: a roller, including a plurality of grooves spirally surrounding the roller, and the grooves configured to be respectively coupled to a plurality of micropipettes, and each of the grooves having a first end and a second end, and a spacing between the first ends of the grooves smaller than a spacing between the second ends of the grooves, in which the grooves include a first group of the grooves and a second group of the grooves, and the first ends of the first group of the grooves are far away from the first ends of the second group of the grooves.

In some embodiments of the present disclosure, the roller has two ends opposite to each other, and the first ends of the first group of the grooves and the first ends of the second group of the grooves are close to the two ends, respectively.

In some embodiments of the present disclosure, the device is used to automatically separate peripheral blood mononuclear cells from a blood sample of a biological body.

In some embodiments of the present disclosure, the device is used to automatically separate circulating tumor cells from a blood sample of a biological body.

Another automatic processing device for the liquid samples of the present disclosure is provided, which includes a sample region, a mechanical module, an image identification device, a centrifuge and a control module. The sample region is configured to accommodate a plurality of centrifuge tubes. The mechanical module is configured to unscrew or tighten upper caps of the centrifuge tubes, and is configured to draw liquid from the centrifuge tubes or discharge liquid to the centrifuge tubes. The centrifuge is configured to accommodate the centrifuge tubes and perform centrifugal treatment. The control module is coupled to the mechanical module and configured to control the mechanical module, the image identification device and the centrifuge.

In some embodiments of the present disclosure, the sample region is further configured to accommodate a plurality of blood collection tubes, and the image identification device is configured to identify a sample label of each of the blood collection tubes and/or identify a height of a blood volume in each of the blood collection tubes, and/or configured to capture and identify images of the centrifuge tubes before the centrifugal treatment and/or after the centrifugal treatment.

In some embodiments of the present disclosure, the mechanical module at least includes an uncapping/capping machine and a liquid drawing/discharging machine.

In some embodiments of the present disclosure, the centrifuge tubes at least include a first group of the centrifuge tubes and a second group of the centrifuge tubes, and a size of each of the first group of the centrifuge tubes is larger than that of each of the second group of the centrifuge tubes, and the uncapping/capping machine includes: a plurality of clamping portion, each of the clamping portions having a first clamping portion and a second clamping portion, and the second clamping portion located over the first clamping portion, and the first clamping portion corresponding to an upper cap of one of the first group of the centrifuge tubes, and the second clamping portion corresponding to an upper cap of one of the second group of the centrifuge tubes.

In some embodiments of the present disclosure, the centrifuge tubes at least include a first group of the centrifuge tubes and a second group of the centrifuge tubes, and a size of each of the first group of the centrifuge tubes is larger than that of each of the second group of the centrifuge tubes, and the liquid drawing/discharging machine includes: a roller, including a plurality of grooves spirally surrounding the roller, and the grooves configured to be respectively coupled to a plurality of micropipettes, and each of the grooves having a first end and a second end, and a spacing between the first ends of the grooves smaller than a spacing between the second ends of the grooves, in which the grooves include a first group of the grooves and a second group of the grooves, and the first ends of the first group of the grooves are far away from the first ends of the second group of the grooves.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE PREFERRED EMBODIMENT

In order to make the description of the present disclosure more detailed and complete, the following provides an illustrative description for the implementation of the present disclosure and specific embodiments; but this is not the only way to implement or use the specific embodiments of the present disclosure. The embodiments disclosed below can be combined or substituted with each other under beneficial circumstances, and other embodiments can also be added to an embodiment without further description.

Figure 1:
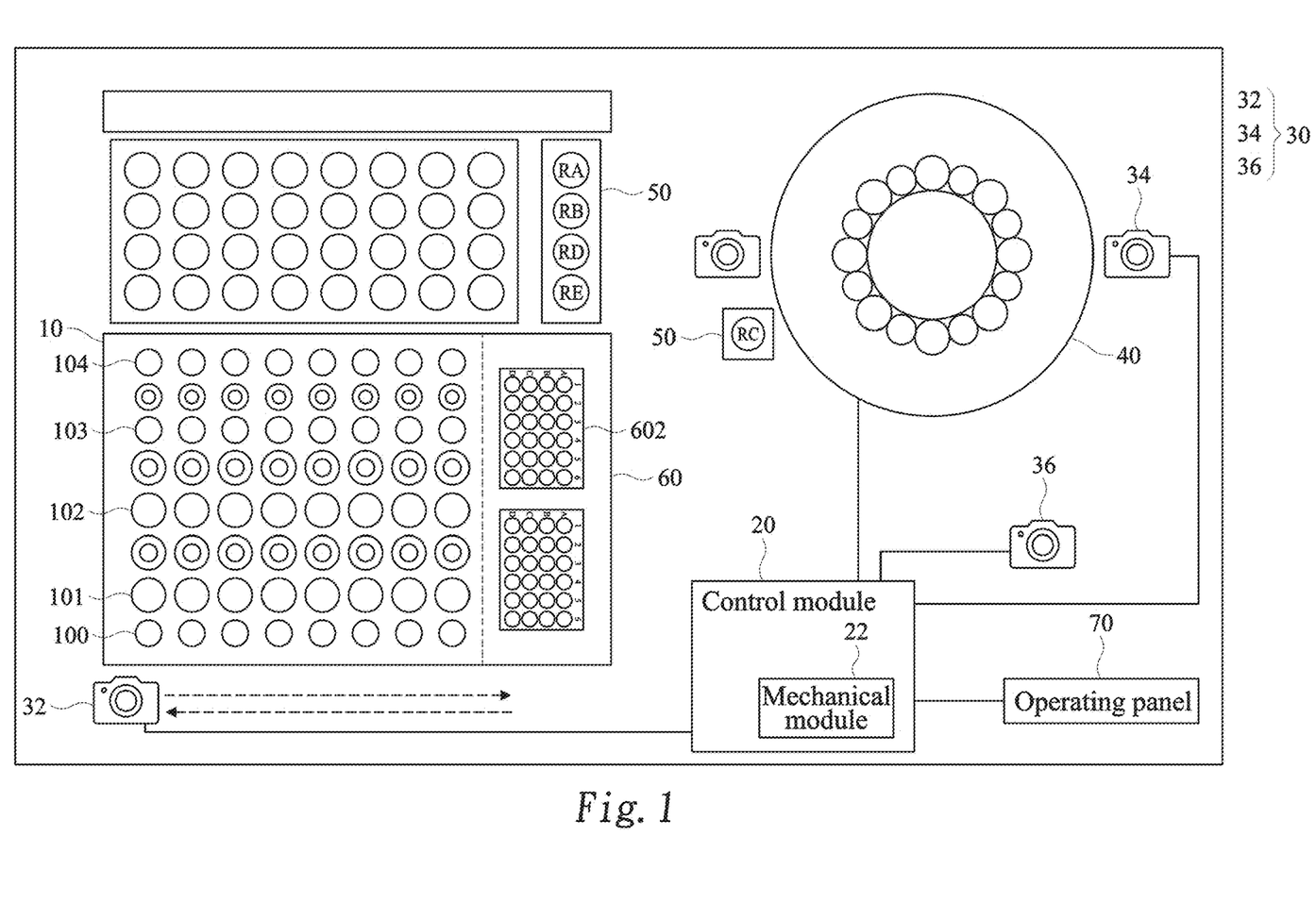
FIG. 1 is a conceptual implementation top view of an automatic processing device for liquid samples according to some embodiments of the present disclosure.

In order to solve the issues of the prior art, the present disclosure provides an automatic processing device for liquid samples, thereby reducing labor costs, shortening the overall processing time, and avoiding human mistaking and human judgment errors. For example, the device can automatically process and identify multiple sets of liquid samples, so it can avoid human mistaking and subsequent execution errors. In addition, the device can automatically read, so it can avoid human judgment errors. FIG. 1 is a conceptual implementation top view of an automatic processing device for liquid samples according to some embodiments of the present disclosure. As shown in FIG. 1, the device includes a sample region 10, a control module 20, an image identification device 30 and a centrifuge 40.

In some embodiments, the device further includes a reagent region 50 for storing reagents (e.g., reagent A, reagent B, reagent C, reagent D, and reagent E) that need to be used in a method of processing liquid samples (e.g., a method of separating cells from blood). In some embodiments, the reagent region 50 may be an ambient temperature reagent region or a refrigerated reagent region.

In some embodiments, the device further includes a culture device region 60 for placing culture devices 602, such as culture dishes or multi-well culture dishes.

In some embodiments, the device further includes an operating panel 70, which is coupled to the control module 20. The operator can issue instructions through the operating panel 70 so that the control module 20 can operate according to the instructions.

In some embodiments, the device further includes a sterilization device (not shown), such as an ultraviolet lamp, which can irradiate ultraviolet rays in the operating space to achieve a sterilization effect.

The sample region 10 is configured to accommodate a plurality of tubes, such as liquid sample tubes (e.g., blood collection tubes) 100 and/or tubes 101, 102, 103, 104. The sample in the liquid sample tube 100 may be from a human or animal body, such as a cat, dog, or another mammal that can be raised. The tubes 101, 102, 103, and 104 are, for example, 15 ml centrifuge tubes or 50 ml centrifuge tubes, which may be empty tubes or tubes filled with reagents. In some embodiments, the tube 101 contains the reagent A and the reagent B, and the tube 103 contains the reagent A, and the tubes 102 and 104 are empty tubes. In some embodiments, the device further includes a warning system (not shown). If the number of samples is odd, the device cannot be activated.

The control module 20 includes a mechanical module 22. In some embodiments, the mechanical module 22 includes a mechanical arm and electric pipettes, which are configured to move the blood collection tubes 100 and/or the tubes 101, 102, 103, 104, and to unscrew and tighten (screw) upper caps of the blood collection tubes 100 and/or the tubes 101, 102, 103, 104, and to draw or discharge samples or reagents. In some embodiments, the device further includes a carrier (not shown), which is coupled to the control module 20 and configured to carry and move the blood collection tubes 100 and/or the tubes 101, 102, 103, or 104 in the sample region 10 to facilitate the operations of the mechanical module 22.

The image identification device 30 is coupled to the control module 20. The image identification device 32 in the image identification device 30 is configured to identify a height of a blood volume in each of the blood collection tubes 100. The next step can be performed if the heights of the blood volumes in the blood collection tubes 100 are the same. In some embodiments, if the heights of the blood volumes in the blood collection tubes 100 are inconsistent, a set value is used as a reference (e.g., the operator can set the height of the blood volume through the operating panel 70). The reagent B may be taken out through the mechanical module 22 and added to the blood collection tube 100 that the height of the blood volume does not reach the set value, so that the height of the blood volume in each of the blood collection tubes 100 reaches the set value, so that subsequent centrifugal separation treatment can be performed. In some embodiments, the image identification device 32 includes an automatic optical inspection (AOI) system. In some embodiments, the automatic optical inspection system uses machine vision to record positions of the samples, sampling determination, and operation processes.

The centrifuge 40 is coupled to the control module 20. The centrifuge 40 is configured to perform the centrifugal separation treatment on the samples in the centrifuge tubes (e.g., the tubes 101, 102, 103, or 104). In some embodiments, the centrifuge 40 includes a positionable system that can be integrated and tested to make the position of the sample consistent before and after the centrifugal treatment, so as to prevent the sample from being erroneously taken after the centrifugal separation treatment. In some embodiments, the centrifuge 40 has an oscillating function, which can help the sample and the reagent to be uniformly mixed.

In some embodiments, the image identification device 34 in the image identification device 30 is configured to capture images of the samples in the tubes after centrifugal treatment.

In some embodiments, the image identification device 36 in the image identification device 30 is configured to identify a position of a certain layer of the sample in the tube. In some embodiments, the image identification device 36 is combined with the mechanical module 22 to completely take out the layer of the sample.

The control module 20 is coupled to and configured to control the operation of the mechanical module 22, the image identification device 30, and the centrifuge 40 to perform various steps of the method of processing the liquid samples.

Figure 2:
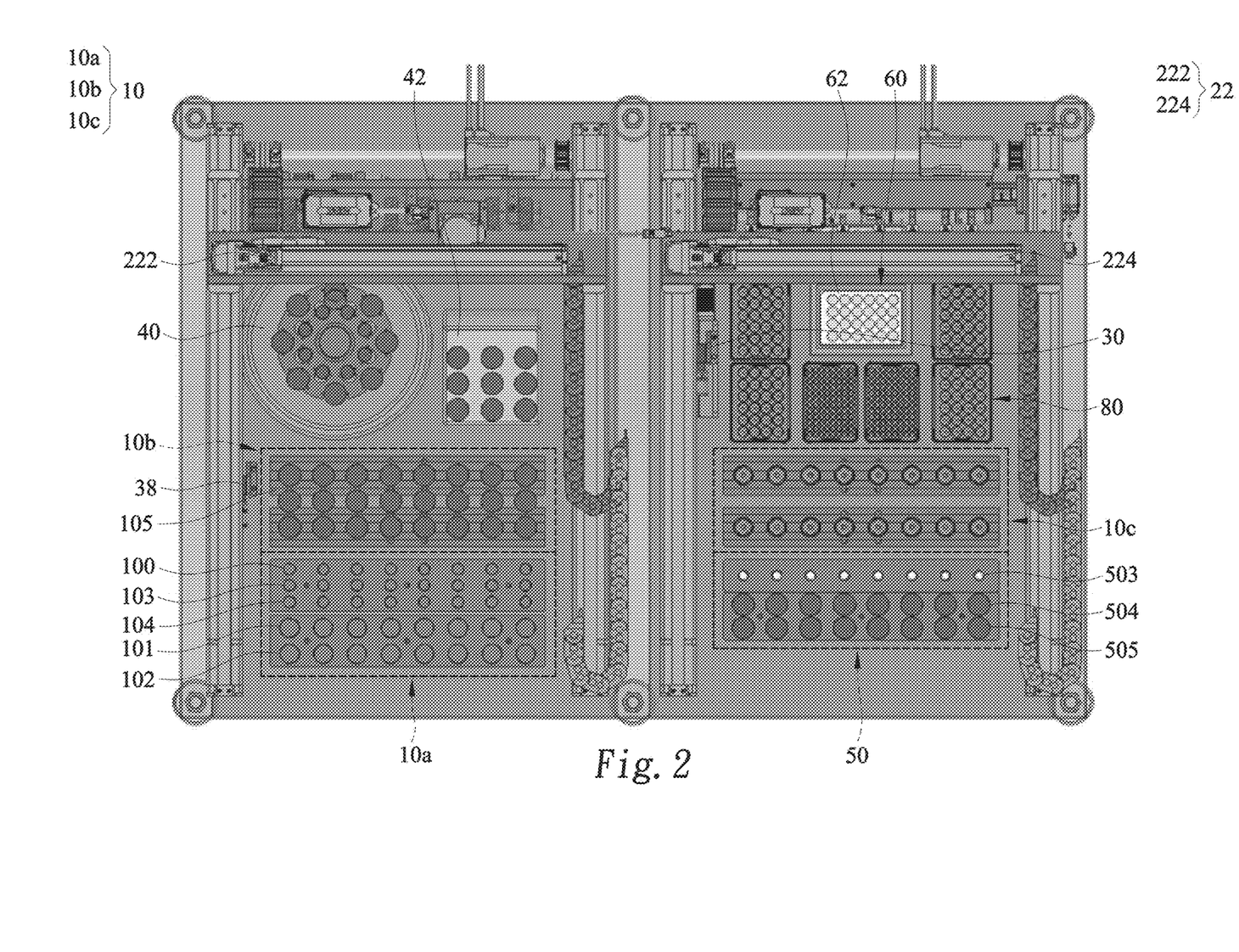
FIG. 2 is an actual implementation top view of an automatic processing device for liquid samples according to some embodiments of the present disclosure.
Figure 3:
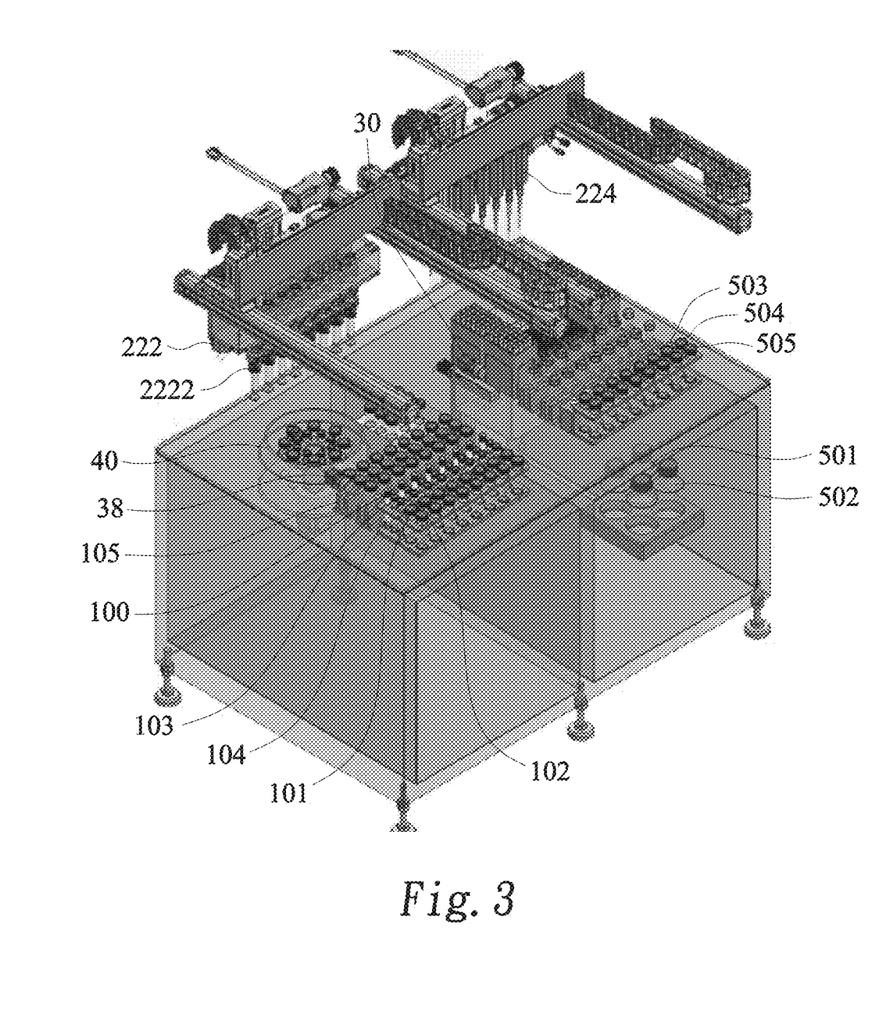
FIG. 3 is an actual implementation front perspective view of an automatic processing device for liquid samples according to some embodiments of the present disclosure.
Figure 4:
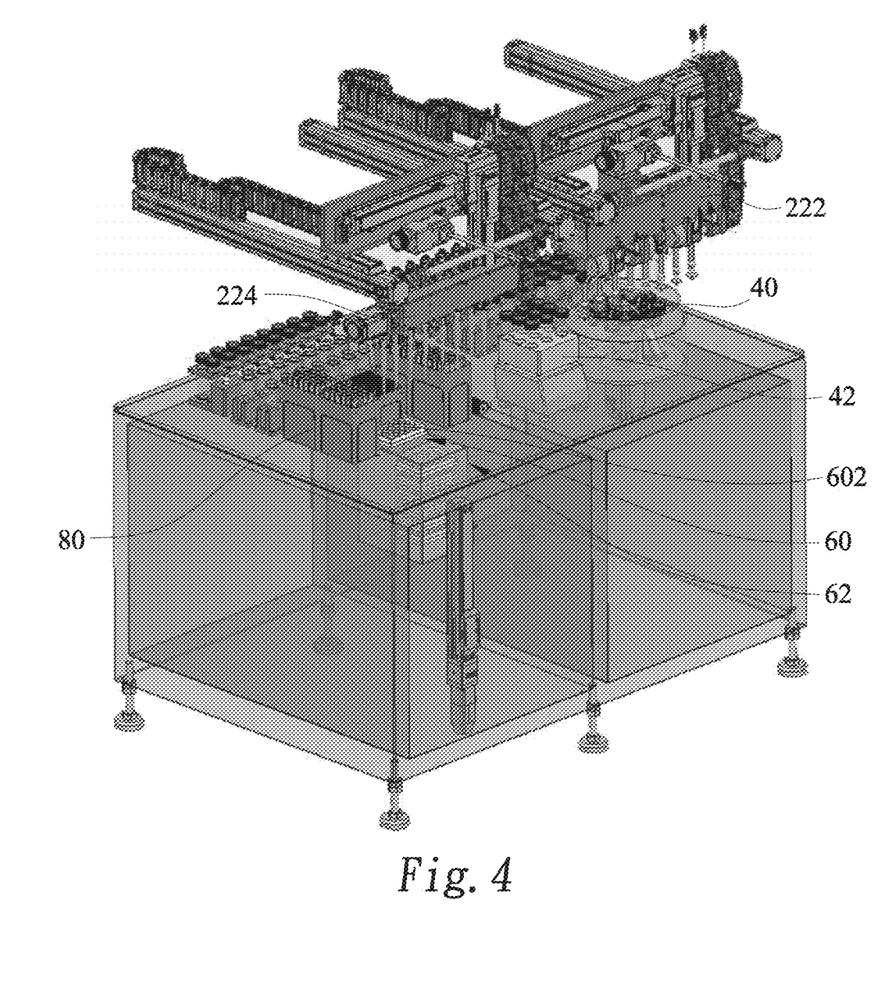
FIG. 4 is an actual implementation rear perspective view of an automatic processing device for liquid samples according to some embodiments of the present disclosure.
Figure 5:
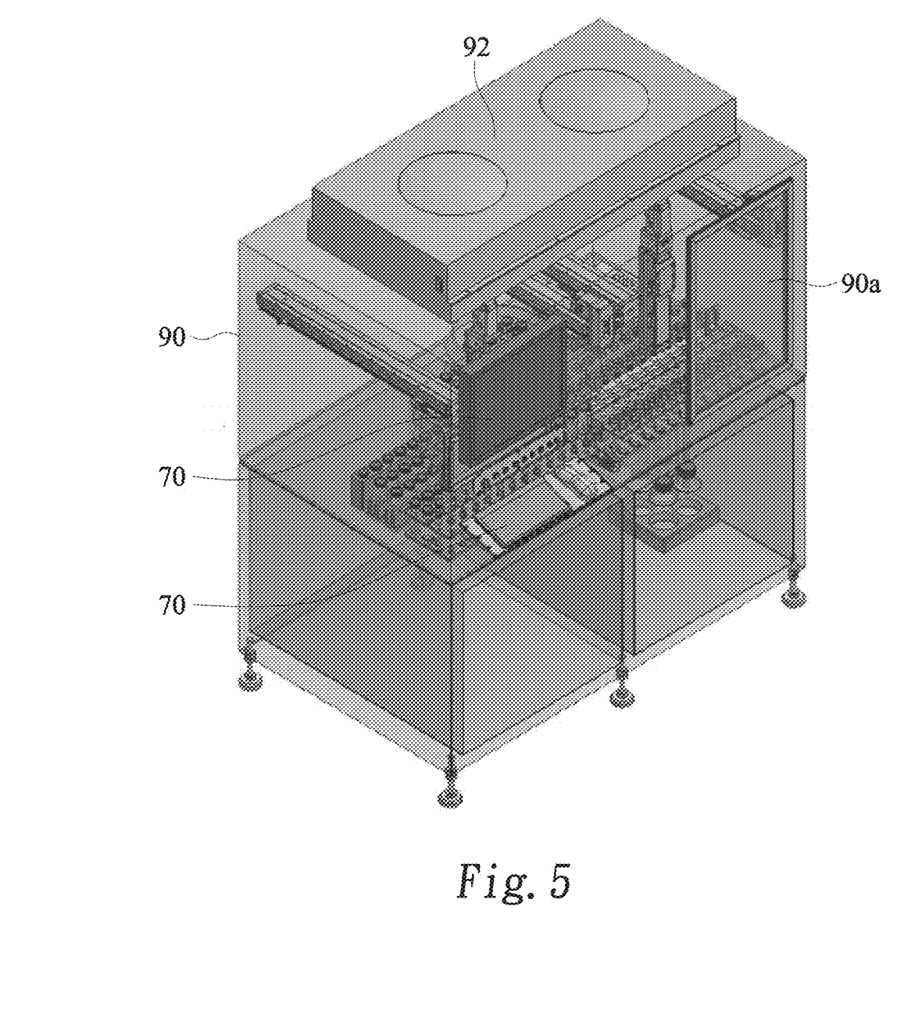
FIG. 5 is an actual implementation schematic diagram of an appearance of an automatic processing device for liquid samples according to some embodiments of the present disclosure.

FIG. 2 is an actual implementation top view of an automatic processing device for liquid samples according to some embodiments of the present disclosure. FIG. 3 is an actual implementation front perspective view of an automatic processing device for liquid samples according to some embodiments of the present disclosure. FIG. 4 is an actual implementation rear perspective view of an automatic processing device for liquid samples according to some embodiments of the present disclosure. FIG. 5 is an actual implementation schematic diagram of an appearance of an automatic processing device for liquid samples according to some embodiments of the present disclosure. As shown in FIGS. 2 to 4, the device includes a sample region 10, a mechanical module 22, an image identification device 30, and a centrifuge 40.

As shown in FIGS. 2 and 3, the sample region 10 is configured to accommodate the liquid sample tubes 100 and the centrifuge tubes 101, 102, 103, and 104. In some embodiments, the sample region 10 includes a placement region 10a, an uncapping/capping region 10b adjacent to the placement region 10a, and a liquid drawing/discharging region 10c adjacent to the uncapping/capping region 10b.

The mechanical module 22 is configured to unscrew or tighten upper caps of the centrifuge tubes 101, 102, 103, and 104, and is configured to draw liquid from the centrifuge tubes 101, 102, 103 or 104 or discharge liquid to the centrifuge tubes 101, 102, 103 or 104. In some embodiments, the centrifuge tubes at least includes a first group of the centrifuge tubes (e.g., the tubes 101 or 102) and a second group of the centrifuge tubes (e.g., the tubes 103 or 104), and a size of each of the first group of the centrifuge tubes is larger than that of each of the second group of the centrifuge tubes. In some embodiments, the centrifuge tubes at least includes two sets of the first group of the centrifuge tubes (e.g., the tubes 101 and 102), and the two sets of the first group of the centrifuge tubes have the same size.

As shown in FIGS. 2 to 4, the mechanical module 22 includes an uncapping/capping machine 222 and a liquid drawing/discharging machine 224. The uncapping/capping machine 222 is configured to simultaneously unscrew or tighten upper caps of the first group of the centrifuge tubes (e.g., the tubes 101 or 102), and is configured to simultaneously unscrew or tighten upper caps of the second group of the centrifuge tubes (e.g., the tubes 103 or 104). The liquid drawing/discharging machine 224 is configured to simultaneously draw the liquid from the first group of the centrifuge tubes (e.g., the tubes 101 or 102), and is configured to simultaneously draw the liquid from the second group of the centrifuge tubes (e.g., the tubes 103 or 104), and is configured to simultaneously discharge the liquid to the first group of the centrifuge tubes, and is configured to simultaneously discharge the liquid to the second group of the centrifuge tubes. For example, the liquid drawing/discharging machine 224 can simultaneously draw the liquid from the first group of the centrifuge tubes (e.g., the tubes 102) and then simultaneously discharge the liquid to the second group of the centrifuge tubes (e.g., the tubes 103). The liquid drawing/discharging machine 224 can also simultaneously draw the liquid from the first group of the centrifuge tubes (e.g., the tubes 101) and then simultaneously discharge the liquid to another first group of the centrifuge tubes (e.g., the tubes 102).

In some embodiments, as shown in FIGS. 2 and 3, the uncapping/capping machine 222 includes a plurality of clamping portions 2222. As such, the clamp portions 2222 of the uncapping/capping machine 222 can clamp upper caps of at least one group of tubes (e.g., the liquid sample tubes 100 and/or the centrifuge tubes 101, 102, 103 or 104) of the placement region 10a. The group of the tubes can be moved to the uncapping/capping region 10b by the uncapping/capping machine 222, and then uncapped.

In some embodiments, as shown in FIGS. 2 and 3, the device further includes a carrier 105, which is configured to carry at least one group of the tubes (e.g., the liquid sample tubes 100 and/or the centrifuge tubes 101, 102, 103 or 104), and can move back and forth between the uncapping/capping region 10b and the liquid drawing/discharging region 10c. In some embodiments, after the group of the tubes is uncapped, the carrier 105 moves from the uncapping/capping region 10b to the liquid drawing/discharging region 10c to move the group of the tubes to the liquid drawing/discharging region 10c for performing subsequent liquid drawing and discharging steps. After the liquid drawing and discharging steps are performed, the carrier 105 moves from the liquid drawing/discharging region 10c to the uncapping/capping region 10b to move the group of the tubes to the uncapping/capping region 10b for performing subsequent capping steps.

The image identification device 30 is coupled to the control module. The image identification device 30 can identify a height of a blood volume in each of the blood collection tubes 100, and take images of the samples in the tubes before and/or after the centrifugal treatment, and/or identify a position of a certain layer of the sample in each of the tubes. In some embodiments, the device further includes an image identification device 38, which can identify and confirm data of a label of the tube (e.g., the liquid sample tube 100) to avoid subsequent execution errors.

The centrifuge 40 is coupled to the control module. In some embodiments, the device further includes a horizontal oscillator 42. In some embodiments, the horizontal oscillator 42 is disposed adjacent to the centrifuge 40.

In some embodiments, as shown in FIGS. 2 and 3, the device further includes a reagent region 50 for storing reagents (e.g., the reagents 501, 502, 503, 504 and 505).

In some embodiments, as shown in FIGS. 2 and 4, the device further includes a culture device region 60 for placing culture devices 602, such as culture dishes or multi-well culture dishes. In some embodiments, the device further includes a culture temporary storage region 62 for temporarily storing the culture devices 602.

In some embodiments, as shown in FIGS. 2 and 4, the device further includes a consumable region 80 configured to accommodate consumables such as micropipettes.

In some embodiments, as shown in FIG. 5, the device further includes an operating panel 70, which is coupled to the control module. The operator can issue instructions through the operating panel 70 to make the mechanical module 22, the image identification device 30 and the centrifuge 40 coupled to the control module operate according to the instructions.

In some embodiments, as shown in FIGS. 2 and 5, the device further includes an outer cover 90, which covers the sample region 10, the mechanical module 22, the image identification device 30, the centrifuge 40, the reagent region 50, the culture device region 60 and the consumable region 80 to prevent the external environment from affecting the test operation. In some embodiments, the outer cover 90 includes a window 90a, and the inside of the device can be cleaned through the window 90a. The operator can also put the samples, the reagents, and the consumables to be tested into the device through the window 90a. In some embodiments, the device further includes an air filter 92, such as a high-efficiency particulate air (HEPA), to ensure the cleanliness of the operating environment.

Figure 6:
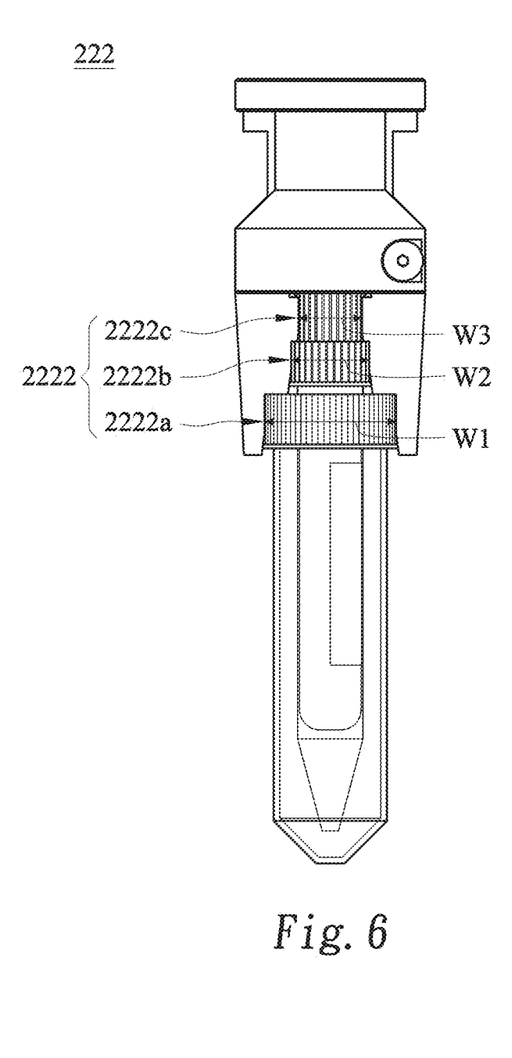
FIG. 6 is a schematic diagram of an uncapping/capping machine according to some embodiments of the present disclosure.

It is worth noting that the uncapping/capping machine 222 shown in FIG. 3 can uncap upper caps of each of the multiple groups of tubes with different sizes, and various embodiments thereof will be described in detail below. FIG. 6 is a schematic diagram of an uncapping/capping machine according to some embodiments of the present disclosure. As shown in FIG. 6, the clamping portion 2222 of the uncapping/capping machine 222 has a first clamping portion 2222a and a second clamping portion 2222b, and the second clamping portion 2222b is located over the first clamping portion 2222a. The first clamping portion 2222a corresponds to an upper cap of one of the first group of the centrifuge tubes (e.g., the tubes 101 or 102), and the second clamping portion 2222b corresponds to an upper cap of one of the second group of the centrifuge tubes (e.g., the tubes 103 or 104). In some embodiments, a width W2 of a second space defined by the second clamping portion 2222b is smaller than a width W1 of a first space defined by the first clamping portion 2222a. Since the clamping portion 2222 of the uncapping/capping machine 222 has the above-mentioned structure, it can be configured to simultaneously unscrew (or tighten) the upper caps of the first group of the centrifuge tubes and can simultaneously unscrew (or tighten) the upper caps of the second group of the centrifuge tubes.

In some embodiments, as shown in FIGS. 3 and 6, the uncapping/capping machine 222 is further configured to pull up upper caps of a group of the liquid sample tubes (e.g., the blood collection tubes 100). In some embodiments, the clamping portion 2222 of the uncapping/capping machine 222 further has a third clamping portion 2222c located over the second clamping portion 2222b, and the third clamping portion 2222c corresponds to an upper cap of one of the liquid sample tubes (e.g., the blood collection tubes 100). In some embodiments, a width W3 of a third space defined by the third clamping portion 2222c is smaller than the width W2 of the second space defined by the second clamping portion 2222b. Since the clamping portion 2222 of the uncapping/capping machine 222 has the above-mentioned structure, it can be configured to simultaneously unscrew (or tighten) the upper caps of the first group of the centrifuge tubes and can be configured to simultaneously unscrew (or tighten) the upper caps of the second group of the centrifuge tubes, and it can also be configured to simultaneously pull up (or press back) the upper caps of the group of the liquid sample tubes.

Figure 7A:
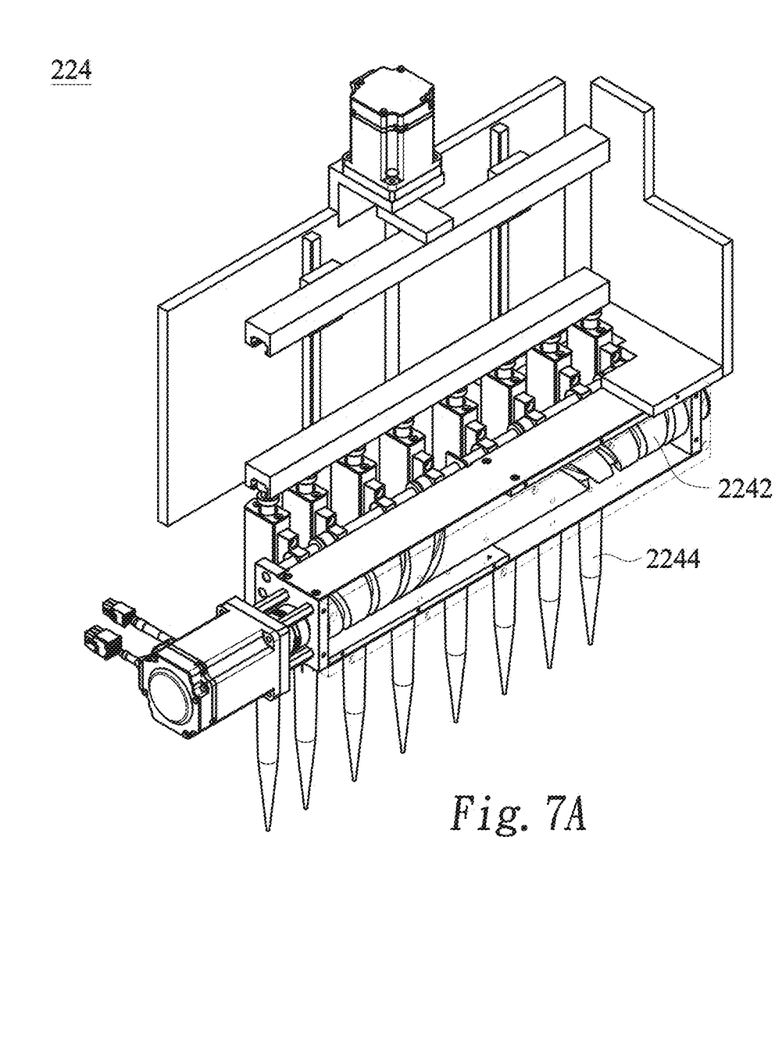
FIG. 7A is a schematic diagram of a liquid drawing/discharging machine according to some embodiments of the present disclosure.
Figure 7B:
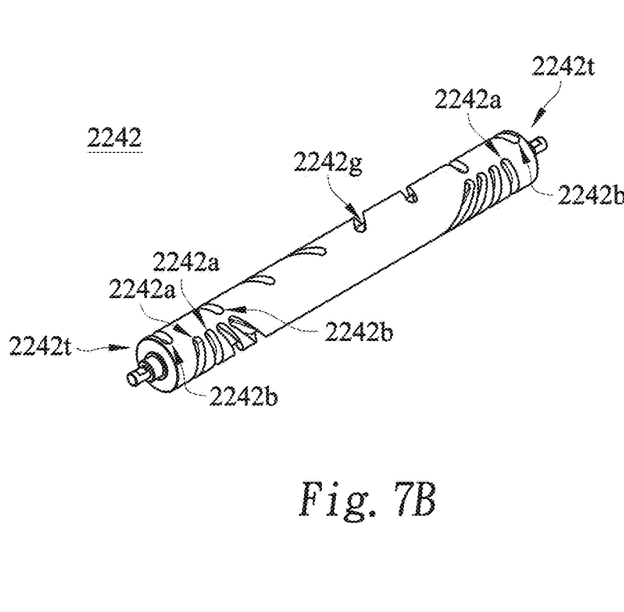
FIG. 7B is a schematic diagram of a roller of a liquid drawing/discharging machine according to some embodiments of the present disclosure.

In another aspect, the liquid drawing/discharging machine 224 shown in FIG. 3 can freely adjust the spacing between the micropipettes to match the spacing of each of the multiple groups of tubes with different sizes. Various embodiments thereof will be described in detail below. FIG. 7A is a schematic diagram of a liquid drawing/discharging machine according to some embodiments of the present disclosure. FIG. 7B is a schematic diagram of a roller of a liquid drawing/discharging machine according to some embodiments of the present disclosure. As shown in FIG. 7A, the liquid drawing/discharging machine 224 includes a roller 2242 and a plurality of micropipettes 2244, and the micropipettes 2244 are coupled to the roller 2242. In some embodiments, the liquid drawing/discharging machine 224 can automatically unload the used micropipettes 2244, and then install new micropipettes 2244.

As shown in FIG. 7B, the roller 2242 includes a plurality of grooves 2242g spirally surrounding the roller 2242. The grooves 2242g are configured to be respectively coupled to the micropipettes 2244 shown in FIG. 7A. Each of the grooves 2242g has a first end 2242a and a second end 2242b. A spacing between the first ends 2242a of the grooves 2242g is smaller than a spacing between the second ends 2242b of the grooves 2242g. As such, the roller 2242 can be rotated to adjust the spacing between the micropipettes 2244 coupled to the grooves 2242g.

In some embodiments, the grooves 2242g include a first group of the grooves (e.g., the four grooves on the left as shown in FIG. 7B) and a second group of the grooves (e.g., the four grooves on the right as shown in FIG. 7B), and the first ends 2242a of the first group of the grooves are away from the first ends 2242a of the second group of the grooves. In some embodiments, the roller 2242 has two ends 2242t opposite to each other, and the first ends 2242a of the first group of the grooves and the first ends 2242a of the second group of the grooves are close to the two ends 2242t, respectively. As such, before the liquid drawing and discharging steps, the micropipettes 2244 shown in FIG. 7A can be located beneath the two ends 2242t of the roller 2242, and the space beneath a middle section of the roller 2242 can be freed to avoid the micropipettes 2244 taking up too much space.

Figure 8A:
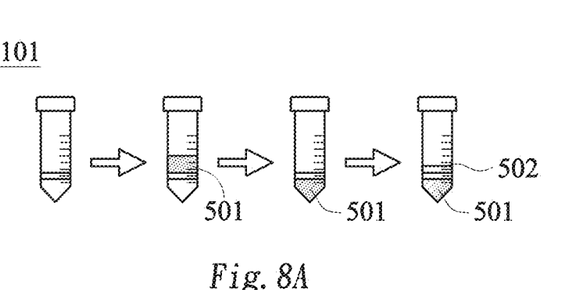
FIG. 8A is a schematic diagram of pre-test processing of a method of automatically separating cells from blood according to some embodiments of the present disclosure.

The following provides a method of automatically separating cells from blood using the above-mentioned device. In some embodiments, the above-mentioned device is suitable for automatically separating peripheral blood mononuclear cells from a blood sample of a biological body. FIG. 8A is a schematic diagram of pre-test processing of a method of automatically separating cells from blood according to some embodiments of the present disclosure. FIGS. 9 to 15 are schematic diagrams of a method of automatically separating cells form blood according to some embodiments of the present disclosure.

First, the reagents 501, 502, 503, 504, 505, the blood collection tubes 100, the tubes 101, 102, 103, 104 and the consumables required for the method of separating cells from blood are put into the device. Subsequently, the pre-test treatment of the tubes 101 is performed. As shown in FIGS. 2 and 8A, the tubes 101 (each of the tubes 101 has a filter membrane (not labeled)) are moved to the uncapping/capping region 10b by the uncapping/capping machine 222 of the mechanical module 22, and the upper caps are then unscrewed, and the tubes 101 are then moved to the draw/discharge region 10c by the carrier 105. The reagent A (501) is added to the tubes 101, and the tubes 101 are then moved to the uncapping/capping region 10b by the carrier 105, and the upper caps are then tightened, and the tubes 101 are then moved to the centrifuge 40 by the uncapping/capping machine 222 for the centrifugal separation treatment. After the centrifugal separation treatment is completed, the tubes 101 are taken out by the uncapping/capping machine 222 of the mechanical module 22 and placed back into the uncapping/capping region 10b. Next, the upper caps of the tubes 101 are unscrewed by the uncapping/capping machine 222, and the tubes 101 are then moved to the liquid drawing/discharging region 10c by the carrier 105, and the reagent B (502) is then added to the tubes 101. In some embodiments, the step of adding the reagent A (501) or that of adding the reagent B (502) mentioned above can be performed using a micro pump (not shown), a liquid drawing pipette (not shown) and a liquid discharging pipette (not shown) connected to the micro pump to draw out the reagent A (501) or the reagent B (502) and added it into the tubes.

Figure 9:
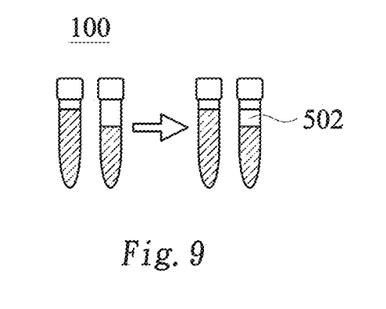
FIGS. 9 to 15 are schematic diagrams of a method of automatically separating cells form blood according to some embodiments of the present disclosure.

Next, a test is carried out. As shown in FIGS. 2 and 9, the upper caps of the blood collection tubes 100 are pulled up by the uncapping/capping machine 222, and the blood collection tubes 100 are then moved to the liquid drawing/discharging region 10c by the carrier 105, and the height of the blood volume in each of the blood collection tubes 100 is identified by the image identification device 30. If the heights of the blood volumes in the blood collection tubes 100 are the same, the next step is performed; if the heights of the blood volumes in the blood collection tubes 100 are inconsistent, a set value is used as a reference, and the reagent B (502) may be discharged into the blood collection tube 100, so that the height of the blood volume in each of the blood collection tubes 100 reaches the set value.

Figure 10:
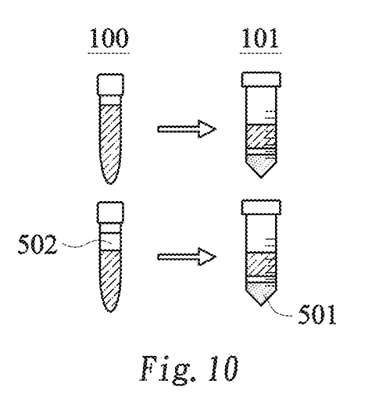

As shown in FIGS. 2 and 10, the liquid in the blood collection tubes 100 is respectively added to the tubes 101 through the liquid drawing/discharging machine 224.

Figure 11:
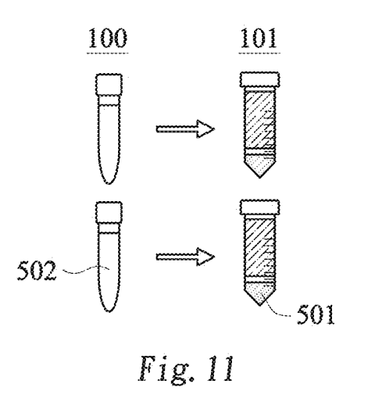

As shown in FIG. 11, the reagent B (502) is added to the blood collection tubes 100 for cleaning, and the liquid in the blood collection tubes 100 is then added to the tubes 101, respectively. In some embodiments, this step is optional and can be repeated.

Figure 12:
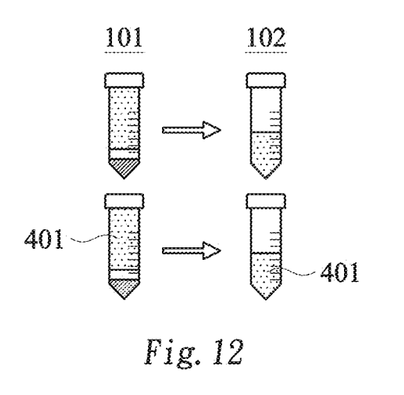

As shown in FIGS. 2, 11 and 12, the upper caps of the tubes 101 are tightened, and the tubes 101 are then moved to the centrifuge 40 for the centrifugal separation treatment, which may be also called as a first centrifugal separation treatment.

As shown in FIGS. 2 and 12, after the centrifugal separation treatment is completed, the tubes 101 are taken out from the centrifuge 40 and placed back into the uncapping/capping region 10b. The upper caps of the tubes 101 and the tubes 102 are unscrewed, and the supernatant 401 in the tubes 101 is drawn and then discharged into the tube 102. In some embodiments, after the centrifugal separation treatment is completed, images of the tubes 101 after the centrifugal separation treatment are taken by the image identification device 30. In some embodiments, the image identification device 30 can not only capture the images after the centrifugal separation treatment of the tubes 101 is completed, but also determine whether the sample is completely separated after the centrifugal separation treatment, and whether hemolysis has occurred.

Figure 13:
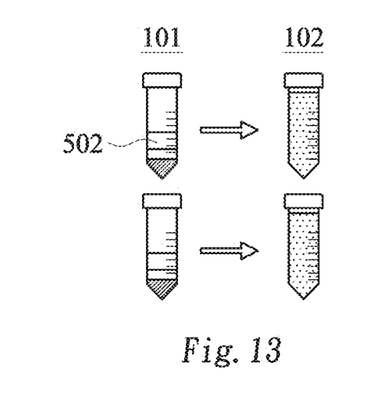

As shown in FIG. 13, the reagent B (502) is added to the tubes 101 for cleaning, and the liquid in the tubes 101 is then added to the tubes 102, respectively. In some embodiments, this step is optional and can be repeated.

Figure 14:
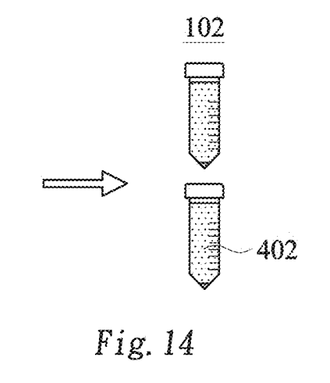

As shown in FIGS. 2, 13 and 14, the upper caps of the tubes 102 are tightened, and the tubes 102 are then moved to the centrifuge 40 for the centrifugal separation treatment, which may also be called as a second centrifugal separation treatment.

Figure 15:
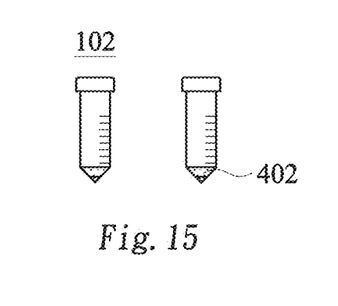

As shown in FIGS. 2 and 15, after the centrifugal separation treatment is completed, the tubes 102 are taken out from the centrifuge 40 and placed back into the uncapping/capping region 10b. The upper caps of the tubes 102 are unscrewed, and a portion of the supernatant 402 in the tubes 102 are removed, leaving some of the supernatant 402 (e.g., about 1 ml), and the upper caps of the tubes 102 are then tightened. The samples in the tubes 102 are the peripheral blood mononuclear cells.

In some embodiments, the above-mentioned device is also suitable for automatically separating circulating tumor cells (CTCs) from a blood sample of a biological body. In some embodiments, the circulating tumor cells separated by the method can be cultured and expanded, and the expanded circulating tumor cells can be tested for drug screening to provide medication guidance for subsequent clinical diagnosis.

Figure 8B:
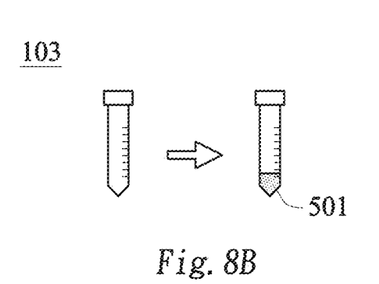
FIG. 8B is a schematic diagram of pre-test processing of a method of automatically separating cells from blood according to some embodiments of the present disclosure.

The method of separating the circulating tumor cells from blood will be described in detail below. FIG. 8B is a schematic diagram of pre-test processing of a method of automatically separating cells from blood according to some embodiments of the present disclosure. FIGS. 16 to 19 are schematic diagrams of a method of automatically separating cells form blood following FIG. 15 according to some embodiments of the present disclosure.

First, the pre-test treatments of the tubes 101 and the tubes 103 are performed. For the pre-test treatment of the tubes 101, please refer to the description of FIG. 8A above, so it will not be repeated here. For the pre-test treatment of the tubes 103, as shown in FIG. 8B, the upper caps of tube 103 are unscrewed, and the reagent A (501) is added to tubes 103, and the upper caps of the tubes 103 are then tightened.

Figure 16:
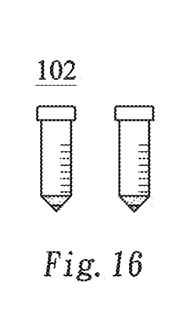
FIGS. 16 to 19 are schematic diagrams of a method of automatically separating cells form blood following FIG. 15 according to some embodiments of the present disclosure.

Next, as shown in FIGS. 2, 15 and 16, the reagent C (503) is drawn and discharged into the tubes 102, and the upper caps of the tubes 102 are them tightened, and the tubes 102 are then moved to the horizontal oscillator 42 for the oscillation treatment, so that the sample and the reagent C in each of the tubes 102 are uniformly mixed. In some embodiments, after the reagent C is added to the tubes 102, the tubes 102 stand for a period of time, and the oscillation treatment is then performed.

Figure 17:
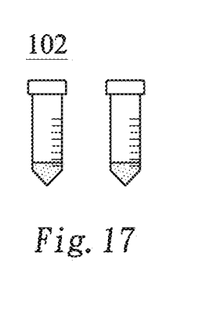

As shown in FIGS. 2 and 17, after the oscillation treatment is completed, the reagent D (504) is taken and added to the tubes 102. In some embodiments, the liquid drawing/discharging machine 224 of FIG. 7A is used to draw and discharge the sample and the reagent D in the tubes 102 to make them uniformly mixed in the tubes 102.

Figure 18:
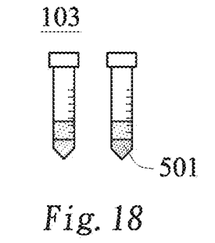

As shown in FIGS. 17 and 18, the liquid in the tubes 102 is slowly added to the tubes 103 (containing the reagent A (501)) along the walls of the tubes 103 respectively, so that the sample in the tube 102 falls on top of the reagent A due to the density difference and thus those present complete layers, so as to prevent the sample in the tube 102 from falling into the reagent A and mixing with it. In some embodiments, the discharging speed and the discharging position (e.g., close to the tube wall) of the micropipette 2244 of the liquid drawing/discharging machine 224 are controlled to achieve the above purpose.

Figure 19:
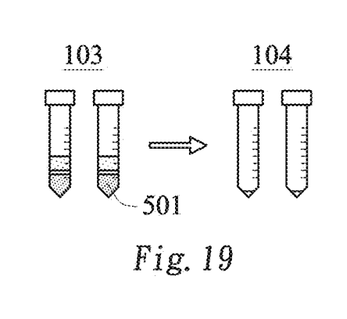

As shown in FIGS. 2, 18, and 19, the tubes 103 are moved to the centrifuge 40 for the centrifugal separation treatment, which may also be called as a third centrifugal separation treatment. In some embodiments, after the centrifugal separation treatment is completed, the image identification device 30 captures images after the centrifugal separation treatment of the tubes 103 is completed.

As shown in FIG. 19, after the centrifugal separation treatment is completed, the image identification device 30 is configured to identify intermediate layers, which may also be called as cell layers, to be taken out of the tubes 103, respectively, and the intermediate layers are then taken out from the tubes 103 by the liquid drawing/discharging machine 224 and then added to the tubes 104. In some embodiments, the image identification device 30 identifies the intermediate layer to be taken out through the color difference.

Next, the image identification device 30 is configured to identify a height of a liquid volume in each of the tubes 104. If the heights of the liquid volumes in the tubes 104 are the same, the next step can be performed; if the heights of the liquid volumes in the tubes 104 are inconsistent, a set value is used as a reference, and the reagent D (504) is discharged into the tube 104, so that the height of the blood volume in each of the tubes 104 reaches the set value. Next, the upper caps of the tubes 104 are taken up by the mechanical module 22 and tightened, and the tubes 104 are then moved to the centrifuge 40 for the centrifugal separation treatment, which may also be called as the fourth centrifugal separation treatment.

After the centrifugal separation treatment is completed, the supernatant in the tubes 104 is removed, and the remaining samples in the tubes 104 are the purified circulating tumor cells.

In some embodiments, a sufficient amount of the reagent E (e.g., more than or equal to 10 ml of the reagent E, which may be a culture medium) is added to the tubes 104. In this way, the circulating tumor cells inside the tubes 104 can be stored for a longer period of time.

In some embodiments, an appropriate amount of the reagent E (e.g., 3 ml to 5 ml of the reagent E, which may be a culture medium) is added to the tubes 104 by the mechanical module 22. Subsequently, the sample (including the purified circulating tumor cells and the culture medium) in the tube 104 can be added to the culture device 602 in the culture device region 60 by the liquid drawing/discharging machine 224 to perform expansion of the circulating tumor cells.

In some embodiments, the operator can select one of the above-mentioned two treatments (i.e., adding the sufficient amount of the reagent E to the tubes 104 and adding the appropriate amount of the reagent E to the tubes 104) through the operating panel 70 of the device according to the purpose.

In some embodiments, the culture medium for culturing the circulating tumor cells at least includes basic fibroblast growth factor (bFGF) and epidermal growth factor (EGF). In some embodiments, the culture medium at least includes platelet lysate. In some embodiments, the culture medium at least includes MEM (or RPMI1640) and other suitable culture medium and antibiotics for avoiding contamination by microorganisms and fungi. The culture device 602 and the method of expanding the circulating tumor cells by the culture device 602 can refer to Taiwan Patent No. 1672376, U.S. Provisional Application No. 62/827,248 and U.S. Provisional Application No. 62/931,236.

It can be seen from the above that the use of the above device for automatically processing the liquid samples (e.g., automatically separating cells from blood) can reduce labor costs, shorten the overall processing time, and avoid human mistaking and human judgment errors. In addition, parameters of the above-mentioned device can be set and adjusted to conform to the steps of separating cells from blood, and thus can be widely used in any field that requires separating cells from blood.

The above-mentioned embodiments are merely illustrative to illustrate the principles and effects of the present disclosure, as well as to explain the technical features of the present disclosure, and are not configured to limit the scope of protection of the present disclosure. Any person skilled in the art can easily complete changes or equal arrangements without departing from the technical principle and spirit of the present disclosure, and all fall within the claimed scope of the present disclosure.

The above-mentioned embodiments are only illustrative of the principles and effects of the present disclosure, as well as explaining the technical features of the present disclosure, rather than limiting the scope of protection of the present disclosure. Anyone who is familiar with the technology can easily complete changes or equal arrangements without violating the technical principles and spirit of the present disclosure. All of them belong to the claim scope of the present disclosure.

What is claimed is:

1. An automatic processing device for liquid samples, comprising:
   a sample region, configured to accommodate a plurality of centrifuge tubes;
   a mechanical module comprising:
      a liquid drawing/dishing machine configured to draw liquid from the centrifuge tubes or discharge liquid to the centrifuge tubes, wherein the liquid drawing/discharging machine comprises:
         a roller, the roller having a first end and a second end opposite to each other, and a plurality of grooves spirally along the longitudinal axis of the roller; and
         a plurality of micropipettes operatively coupled to the plurality of grooves, wherein rotating the roller causes the micropipettes to move laterally in respect to the direction of the grooves; and
      a centrifuge configured to accommodate the centrifuge tubes and perform a centrifugal treatment.

2. The automatic processing device of claim 1, wherein the sample region is further configured to accommodate a plurality of blood collection tubes, and the automatic processing device further comprises:
   an image identification device configured to identify a sample label of each of the blood collection tubes and/or identify a height of a blood volume in each of the blood collection tubes, and/or configured to capture and identify images of the centrifuge tubes before the centrifugal treatment and/or after the centrifugal treatment.

3. The automatic processing device of claim 1, wherein the mechanical module further comprises an uncapping/capping machine.

4. The automatic processing device of claim 3, wherein the centrifuge tubes at least comprise a first group of the centrifuge tubes and a second group of the centrifuge tubes, and a size of each of the first group of the centrifuge tubes is larger than that of each of the second group of the centrifuge tubes, and the uncapping/capping machine comprises:
   a plurality of clamping portions, each of the clamping portions having a first clamping portion and a second clamping portion, and the second clamping portion located over the first clamping portion, and the first clamping portion corresponding to an upper cap of one of the first group of the centrifuge tubes, and the second clamping portion corresponding to an upper cap of one of the second group of the centrifuge tubes.

5. The automatic processing device of claim 1,
   wherein each of the grooves has a first end and a second end;
   wherein a first spacing between the first ends of a pair of adjacent grooves is smaller than a second spacing between the second ends of the grooves;
   wherein the grooves are divided into a first group of the grooves and a second group of the grooves, the first group of the grooves are proximal to the first end of the roller, and the first ends of the second group of the grooves are proximal to the second end of the roller.

6. An automatic processing device for liquid samples, comprising:
   a sample region, configured to accommodate a plurality of centrifuge tubes;
   a control module, comprising a mechanical module, wherein the mechanical module comprises:
      a liquid drawing/discharging machine configured to draw liquid from the centrifuge tubes or discharge liquid to the centrifuge tubes, wherein the liquid drawing/discharging machine comprises;
         a roller, the roller having a first end and a second end opposite to each other, and a plurality of grooves spirally along the longitudinal axis of the roller; and
         a plurality of micropipettes operatively coupled to the plurality of grooves, wherein rotating the roller causes the micropipettes to move laterally in respect to the direction of the grooves;
   an image identification device coupled to the control module; and
   a centrifuge coupled to the control module, wherein the centrifuge is configured to accommodate the centrifuge tubes and perform a centrifugal treatment.

7. The automatic processing device of claim 6, wherein the sample region is further configured to accommodate a plurality of blood collection tubes, and the image identification device is configured to identify a sample label of each of the blood collection tubes and/or identify a height of a blood volume in each of the blood collection tubes, wherein when in at least one of the blood collection tubes the height of the blood volume does not reach a set value, the mechanical module is further configured to add liquid to the at least one of the blood collection tubes that the height of the blood volume does not reach the set value to allow a height of the blood volume in the at least one of the blood collection tubes after the liquid is added to reach the set value.

8. The automatic processing device of claim 6, wherein the image identification device is configured to identify a certain layer of a sample in each of the centrifuge tubes, and the mechanical module is further configured to draw the layer from each of the centrifuge tubes.

9. The automatic processing device of claim 6, wherein the image identification device is configured to capture and identify images of the centrifuge tubes before the centrifugal treatment and/or after the centrifugal treatment.

10. The automatic processing device of claim 6, wherein the sample region comprises an uncapping/capping region and a liquid drawing/discharging region adjacent to the uncapping/capping region, and the device further comprises a carrier configured to carry the centrifuge tubes and move between the uncapping/capping region and the liquid drawing/discharging region.

11. The automatic processing device of claim 6, wherein the centrifuge tubes at least comprise a first group of the centrifuge tubes and a second group of the centrifuge tubes, and a size of each of the first group of the centrifuge tubes is larger than that of each of the second group of the centrifuge tubes, and the mechanical module further comprises:
  an uncapping/capping machine configured to simultaneously unscrew or tighten upper caps of the first group of the centrifuge tubes and configured to simultaneously unscrew or tighten upper caps of the second group of the centrifuge tubes.

12. The automatic processing device of claim 11, wherein the uncapping/capping machine comprises:
  a plurality of clamping portions, each of the clamping portions having a first clamping portion and a second clamping portion, and the second clamping portion located over the first clamping portion, and the first clamping portion corresponding to an upper cap of one of the first group of the centrifuge tubes, and the second clamping portion corresponding to an upper cap of one of the second group of the centrifuge tubes.

13. The automatic processing device of claim 11, wherein the sample region is further configured to accommodate a group of liquid sample tubes, and the uncapping/capping machine is further configured to pull up upper caps of the group of the liquid sample tubes.

14. The automatic processing device of claim 13, wherein the uncapping/capping machine comprises:
  a plurality of clamping portions, each of the clamping portions having a first clamping portion, a second clamping portion and a third clamping portion, and the second clamping portion located over the first clamping portion, and the third clamping portion located over the second clamping portion, and the first clamping portion corresponding to an upper cap of one of the first group of the centrifuge tubes, and the second clamping portion corresponding to an upper cap of one of the second group of the centrifuge tubes, and the third clamping portion corresponding to an upper cap of one of the liquid sample tubes.

15. The automatic processing device of claim 14, wherein a width of a third space defined by the third clamping portion is smaller than a width of a second space defined by the second clamping portion, and the width of the second space defined by the second clamping portion is smaller than a width of a first space defined by the first clamping portion.

16. The automatic processing device of claim 6, wherein the centrifuge tubes at least comprise a first group of the centrifuge tubes and a second group of the centrifuge tubes, and a size of each of the first group of the centrifuge tubes is larger than that of each of the second group of the centrifuge tubes, and the liquid drawing/discharging machine is configured to simultaneously draw liquid from or simultaneously add liquid to the first group of the centrifuge tubes, and configured to simultaneously draw liquid from or simultaneously add liquid to the second group of the centrifuge tubes.

17. The automatic processing device of claim 6,
  wherein each of the grooves has a first end and a second end;
  wherein a first spacing between the first ends of a pair of adjacent grooves is smaller than a second spacing between the second ends of the grooves;
  wherein the grooves are divided into a first group of the grooves and a second group of the grooves, the first group of the grooves are proximal to the first end of the roller, and the first ends of the second group of the grooves are proximal to the second end of the roller.

18. The automatic processing device of claim 6, wherein the device is configured to automatically separate peripheral blood mononuclear cells from a blood sample of a biological body.

19. The automatic processing device of claim 6, wherein the device is configured to automatically separate circulating tumor cells from a blood sample of a biological body.

* * * * *